United States Patent [19]

Ichinoi et al.

[11] Patent Number: 5,062,008
[45] Date of Patent: Oct. 29, 1991

[54] RECORDING OF FREQUENCY-MULTIPLEX SIGNAL ON RECORDING MEDIUM

[75] Inventors: Yutaka Ichinoi, Yokohama; Akira Hirota, Chigasaki; Noboru Watanabe, Yokohama, all of Japan

[73] Assignee: Victor Company of Japan, Ltd., Yokohama, Japan

[21] Appl. No.: 491,928

[22] Filed: Mar. 12, 1990

[30] Foreign Application Priority Data

Mar. 14, 1989 [JP] Japan .................................. 1-61816

[51] Int. Cl.$^5$ ........................ G11B 20/06; G11B 5/02
[52] U.S. Cl. ........................................ 360/29; 360/20
[58] Field of Search ............................. 360/29, 30, 20

[56] References Cited

U.S. PATENT DOCUMENTS 3,536,860 6/1967 Hodder ................................ 360/29
3,830,968 8/1974 Redlich et al. ....................... 360/30
4,322,746 3/1982 Oguino ................................ 368/20

Primary Examiner—Vincent P. Canney
Attorney, Agent, or Firm—Lowe, Price, LeBlanc & Becker

[57] ABSTRACT

An apparatus for producing a frequency-multiplex signal on the basis of a plurality of signals so as to record the produced frequency-multiplex signal on a recording medium, second signal having a frequency lower than that of the first signal. The apparatus includes a multiplying circuit for multiplying the frequency of the second signal by 2 and an amplitude-modulator for multiplying the first signal by the output signal of the multiplying circuit. Also included in the apparatus is an adder for adding the second signal to the output signal of the amplitude-modulator, the output signal of the adder being recorded as the frequency-multiplexing signal on the recording medium.

8 Claims, 4 Drawing Sheets

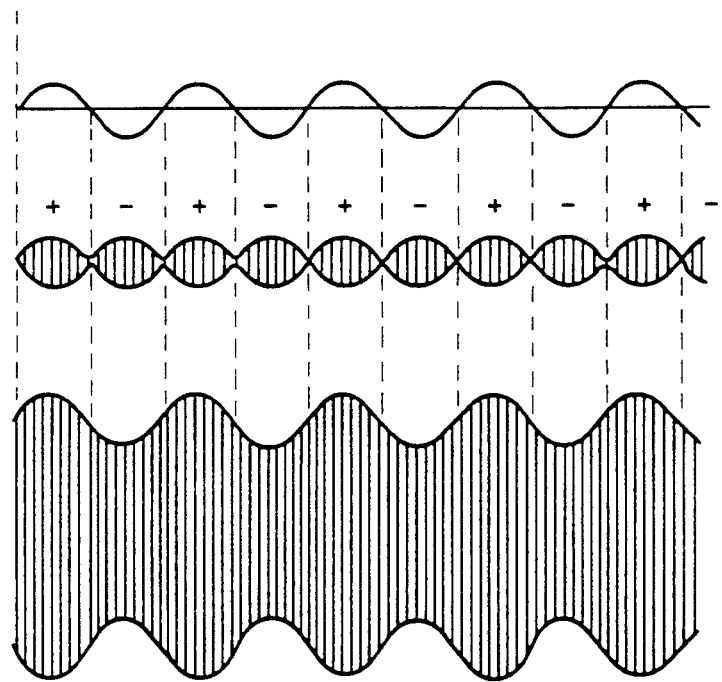

RECORDING OF FREQUENCY-MULTIPLEX SIGNAL ON RECORDING MEDIUM

BACKGROUND OF THE INVENTION

The present invention relates generally to recording of a frequency-multiplex signal, and more particularly to a method and apparatus for recording on a recording medium a frequency-multiplex signal comprising components corresponding to a plurality of signals.

One known way of recording a frequency-multiplex signal involves, as illustrated in FIG. 1A, an adder for merely effecting the addition with respect to a plurality of signals having different frequencies so as to produce a frequency-multiplex signal which is in turn recorded on a recording medium. That is, in FIG. 1A, an adder 7 is responsive to a first signal S1 supplied through an input terminal 1 and a second signal S2 led through an input terminal 2 so as to produce a frequency-multiplex signal corresponding to the addition signal of the first and second signals S1 and S2, the first signal S1 having a frequency of f1 and the second signal S2 having a frequency of f2 which is lower than f1 as illustrated in FIG. 1B. After being amplified by a recording amplifier 4, the produced frequency-multiplex signal is recorded on a recording medium 6 through a recording device such as a magnetic head 5. In case of a magnetic recording/reproduction system, a recording signal current having a waveform (envelopes indicated by heavy solid lines) as exemplarily shown in (c) of FIG. 2 is fed to the magnetic head 5, and the recording is performed on the recording medium 6. Components of the first signal S1 and the second signal S2 in the frequency-multiplex recording signal current fed to the magnetic head 5 are illustrated in (a) and (b) of FIG. 2, respectively.

One problem faced in a recording/reproduction system having a non-linear chanracteristic is generation of an intermodulation distortion in the recording/reproduction signal. More specifically, after recording of a frequency-multiplex signal produced by a first signal with a frequency of f1 and a second signal with a frequency of f2, the reproduction signal reproduced by a recording/reproduction system having a non-linear characteristic includes the first and second signals and further includes spurious signals whose frequencies are $mf1 \pm nf2$ where m and n designate integers, respectively. The introduction of the spurious signals due to the intermodulation distortion causes deterioration of the reproduction signal, thereby resulting in reproduction of a distorted signal as exemplified in (d) of FIG. 2 in correspondance with the recorded frequency-multiplex signal illustrated in (c) of FIG. 2.

SUMMARY OF THE INVENTION

It is therefore an object of the present invention to provide a frequency-multiplex signal recording method and system which capable of extremely reduce the distortion of the reproduction signal due to the introduction of spurious signals irrespective of reproduction of the recorded signal by a recording/reproduction system having a non-linear characteristic.

With this object and other features which will become apparent as the description proceeds, according to the present invention, a method of producing a frequency-multiplex signal on the basis of a first signal and a second signal whose frequency is lower than that of said first signal, to record the produced frequency-multiplex signal on a recording medium, comprising the steps of: doubling the frequency of the second signal so as to produce a frequency-doubled signal; multiplying the produced frequency-doubled signal by the first signal so as to produce a multiplication signal; and adding the multiplication signal to the second signal so as to produce an addition signal which is recorded as the frequency-multiplex signal on the recording medium.

In according with the present invention, there is additionally provided a method of producing a frequency-multiplex signal on the basis of a first signal and a second signal whose frequency is lower than that of the first signal, to record the produced frequency-multiplex signal on a recording medium, comprising the steps of: doubling the frequency of the second signal so as to produce a frequency-doubled signal; adding the first signal to the second signal so as to produce an addition signal; and multiplying the produced frequency-doubled signal by the produced addition signal so as to produce a multiplication signal which is in turn recorded as the frequency-multiplex signal on the recording medium.

In accordance with the present invention, there is further provided an apparatus for producing a frequency-multiplex signal on the basis of a plurality of signals so as to record the produced frequency-multiplex signal on a recording medium, comprising: first input terminal means for inputting a first signal; second input terminal means for inputting a second signal which has a frequency lower than that of the first signal; multiplying means coupled to the second input terminal means for multiplying the frequency of the second signal by 2; amplitude-modulating means coupled to the first input terminal means and the multiplying means for multiplying the first signal by the output signal of the multiplying means; and adder means coupled to the amplitude-modulating means and the second input terminal means for adding the second signal to the output signal of the amplitude-modulating means, the output signal of the adder means being recorded as the frequency-multiplexing signal on the recording medium.

In accordance with the present invention, there is still further provided an apparatus for producing a frequency-multiplex signal on the basis of a plurality of signals so as to record the produced frequency-multiplex signal on a recording medium, comprising: first input terminal means for inputting a first signal; second input terminal means for inputting a second signal which has a frequency lower than that of the first signal; multiplying means coupled to the second input terminal means for multiplying the frequency of the second signal by 2; balanced-modulating means coupled to the first input terminal means and the multiplying means for multiplying the first signal by the output signal of the multiplying means; and adder means for adding the first signal, the second signal and the output signal of the balanced-modulating means, the output signal of the adder means being recorded as the frequency-multiplexing signal on the recording medium.

BRIEF DESCRIPTION OF THE DRAWINGS

The present invention will be described in further detail with reference to the accompanying drawings, in which:

FIGS. 6a through c is a graphic illustration for describing operation of the FIG. 4B signal processing circuit.

DETAILED DESCRIPTION OF THE INVENTION

Figure 3:
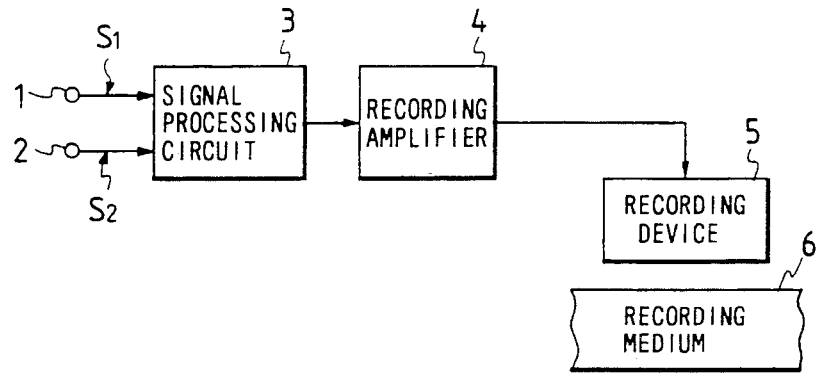
FIG. 3 is a block diagram showing an basic arrangement of a frequency-multiplex signal recording apparatus.

Referring now to FIG. 3, there is illustrated a frequency-multiplex signal recording apparatus according to the present invention. The apparatus comprises a signal processing circuit 3 coupled to first and second input terminals 1 and 2 to respectively receive first and second signals S1 and S2, the second signal S2 having a frequency lower than that of the first signal S1. The signal processing circuit 3 is arranged to produce a frequency-multiplex signal on the basis of the first and second signals S1 and S2. The output signal of the signal processing circuit 3 is supplied through a recording amplifier 4 to a recording device such as a magnetic head 5 which in turn records the output signal of the signal processing circuit 3 on a recording medium 6.

Figure 1A:
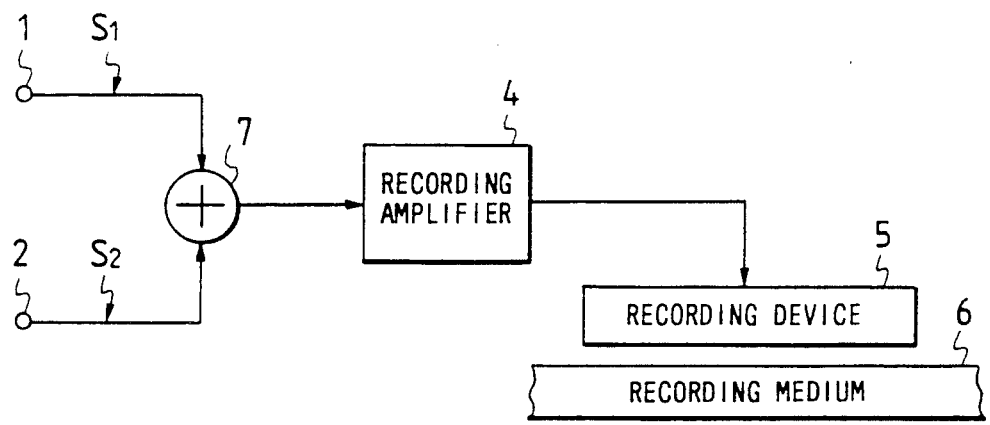
FIG. 1A shows an arrangement of a conventional frequency-multiplex signal recording apparatus.
Figure 1B:
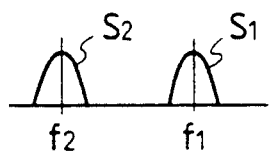
FIG. 1B is an illustration of frequencies of first and second signals inputted in the FIG. 1A recording apparatus.
Figure 5A:
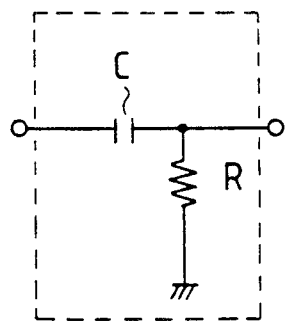
FIGS. 5A and 5B are circuit diagrams for describing examples of a phase-adjusting circuit used in the FIG. 4A and 4B signal processing circuits.
Figure 5B:
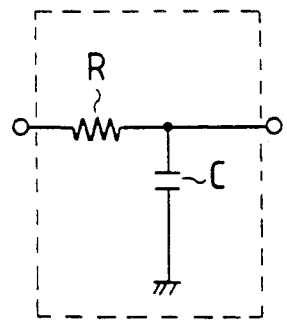
Figure 4A:
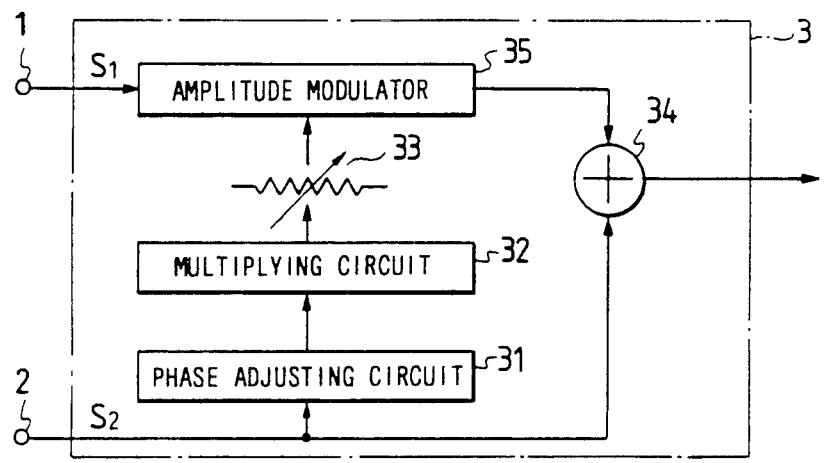
FIGS. 4A and 4B are block diagrams showing circuit arrangements of a signal processing circuit used in the FIG. 3 recording apparatus.

FIG. 4A illustrates a circuit arrangement suitable for the signal processing circuit 3. In FIG. 4A, the first signal S1 is supplied as a carrier signal to an amplitude modulator 35 the output signal of which is supplied to an adder 34, and the second signal S2 is supplied to a phase adjusting circuit 31 and further to the adder 34. The phase adjusting circuit 31 is for adjustment of the phase of the second signal S2 and, for example, takes an circuit arrangement which includes a circuit composed of a resistor R and a capacitor C as illustrated in FIGS. 5A or 5B or which includes a predetermined number of the FIGS. 5A or 5B circuits which are coupled in series to each other. It is also appropriate to, instead of the resistor R of the circuit illustrated in FIGS. 5A or 5B, use a variable resistor and adjust the phase thereof by changing the resistance value of the variable resistor. As will be understood hereinafter, the phase adjusting circuit 31 is provided in order to determine the configuration of the envelope of the recording signal to obtain an adequate reproduction signal.

Figure 2A:
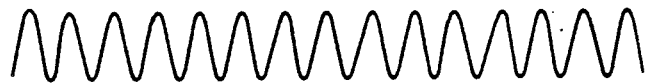
FIGS. 2a through g is a waveform illustration for describing the FIG. 1A conventional recording apparatus and a frequency-multiplex signal recording apparatus according to the present invention.
Figure 2B:
Figure 2C:
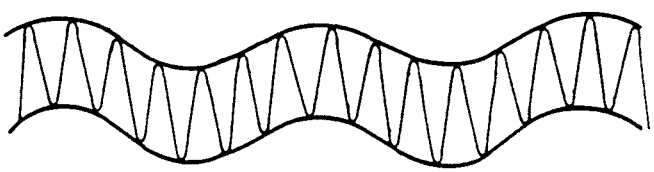
Figure 2D:
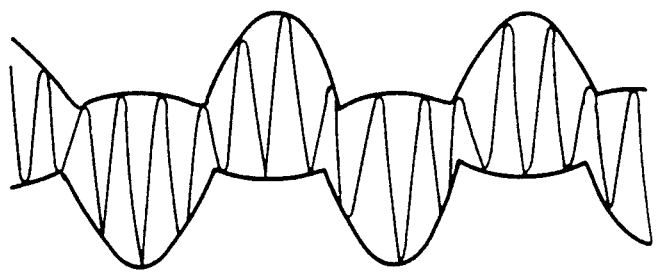
Figure 2E:
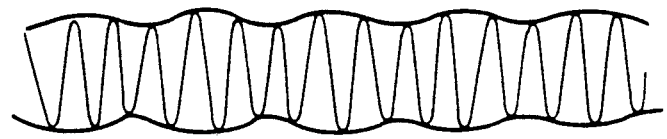
Figure 2F:
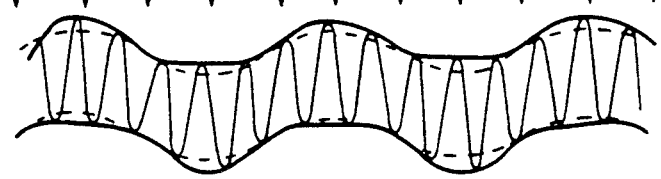
Figure 2G:
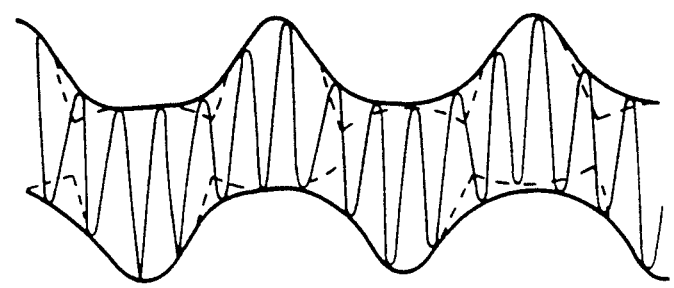

After being phase-adjusted by the phase adjusting circuit 31, the second signal S2 reaches a multiplying circuit 32 which doubles the frequency of the second signal S2. The output signal of the multiplying circuit 32 is supplied to a level adjuster 33 so as to adjust its level, and the level-adjusted output signal is then supplied as a modulating signal to the amplitude modulator 35. The amplitude modulator 35 effects the amplitude modulation with respect to the first signal (carrier signal) S1 in accordance with the output signal (modulating signal) of the level adjuster 33, that is, the amplitude modulator 35 functions as a multiplier for multiplying the first signal S1 by the level-adjusted output signal of the multiplying circuit 32 so as to produce an amplitude-modulated signal as illustrated in (e) of FIG. 2, for example. The produced amplitude-modulated signal is then supplied to the adder 34 so as to be added to the second signal S2. The output signal of the adder 34 is supplied to the recording amplifier 4 and then fed as a recording signal current to the magnetic head 5. Here, the recording current fed to the magnetic head 5 results in having a waveform as illustrated in (f) of FIG. 2. In FIG. 2(f), dotted lines designate as a reference the envelopes of the waveform (illustrated in (c) of FIG. 2) of the frequency-multiplex signal produced by the above-described conventional apparatus. As seen from FIG. 2(f), the recording signal is deformed such that the levels of the first signal component in the vicinities of the high and low portions (indicated by arrows A) of the second signal component are emphasized as compared with the levels of the first signal component at the intermediate portions (indicated by arrows B) between the adjacent high and low portions of the second signal component FIG. 2(g) shows a reproduction signal obtained when reproducing the FIG. 2(f) recording signal once recorded on the recording medium 6. The FIG. 2(g) reproduction signal results in the fact that distortion is extremely reduced as compared with the FIG. 2(d) reproduction signal obtained when reproducing the FIG. 2(c) signal recorded thereon. The reproduction accuracy of the recorded signal depends upon correction of the waveform of the recording signal, i.e., the frequency-multiplex signal. That is, in order to obtain the FIG. 2(f) recording signal having a desirable waveform (envelope), the second signal S2 is required to be adequately phase-adjusted by the phase adjusting circuit 31 before being multiplied by the multiplying circuit 32, thereby adequately adjust the envelope of the recording signal to be recorded on the recording medium 6.

Here, it is known that there is the relation of $V = L \times (di/dt)$ between the voltage V applied across an inductance L and the current i flowing through the inductance L, and hence the phases of the output voltage of the recording amplifier 4 and the current flowing through the magnetic head 5 become different from each other. If the impedance of the magnetic head 5 is a pure inductance, the phase difference becomes 90°. Although due to the aforementioned cause the phase of the second signal S2 changes, the phase of the envelope of the amplitude-modulated signal does not change. Thus, the phase adjustment is effected by the phase adjusting circuit 31 with respect to the second signal S2 so that the first signal is distorted to be emphasized at the vicinities of the high and low portions of the second signal component in the recording signal current fed to the magnetic head.

Although in the above description the phase adjustment is directly made with respect to the second signal S2, it is also appropriate to effect the phase adjustment with respect to the output signal of the multiplying circuit 32. Further, it is also appropriate that the signal processing circuit 3 is arranged such that a signal obtained by the addition of the first and second signals S1 and S2 is supplied as the carrier signal to the amplitude modulator 35 and a signal obtained by phase-adjusting the second signal S2 by the phase adjusting circuit 31 and multiplying the output signal of the phase adjusting circuit 31 by 2 is supplied as a modulating signal to the amplitude modulator 35. In this case, the output signal of the amplitude modulator 35 is supplied as the recording signal ((f) of FIG. 2) through the recording amplifier 4 to the recording device 5.

Figure 4B:
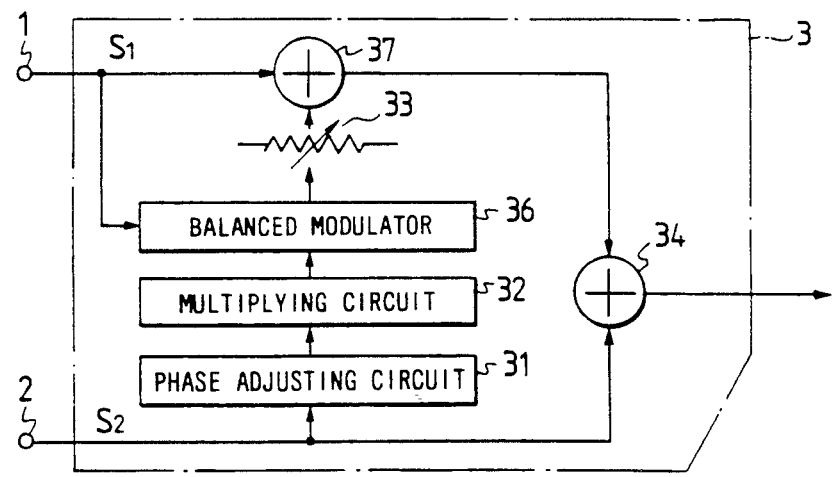

FIG. 4B is a block diagram showing another circuit arrangement of the signal processing circuit 3, where parts corresponding to those in FIG. 4A are marked with the same references and the description thereof will be omitted for brevity. In FIG. 4B, a first signal S1 inputted through an input terminal 1 is supplied to an adder 37 and further to a balanced modulator 36. On the other hand, a second signal S2 having a frequency lower than that of the first signal S1 and inputted through an input terminal 2 is supplied to an adder 34 and further to a phase adjusting circuit 31. The phase-adjusted second signal S2 is led to a multiplying circuit 32 so as to obtain a two-multiplied signal with a waveform as illustrated in (a) of FIG. 6, which is supplied as a modulating signal to the balanced modulator 36 after phase-adjusted and multiplied. The balanced modulator 36 is responsive to the first signal S1 and the output signal of the multiplying circuit 32 to output a signal having a waveform as illustrated in (b) of FIG. 6. That is, the balanced modulator acts as a multiplier for multiplying the first signal S1 by the second signal S2 whose frequency is doubled by the multiplying circuit 32. In (b) of FIG. 6, signs + and − represent the phase states with respect to the first signal (a carrier wave) S1 (the sign + means that the phase is the same as that of the first signal S1 and the sign − means that the phase is the reverse to that of the first signal S1). The output signal of the balanced modulator 36 is supplied through a level adjuster 33 to the adder 37 which in turn adds the output signal of the balanced modulator 36 to the first signal S1 so as to produce a signal with a waveform as illustrated in (c) of FIG. 6. The output signal of the adder 37 is supplied to the adder 34 to be added to the second signal S2, thereby producing a recording signal substantially equal to the recording signal (illustrated in (f) of FIG. 2) obtained by the FIG. 4A signal processing circuit 3.

Here, although in the signal processing circuit 3 illustrated in FIG. 4B the phase adjustment is effected by the phase adjusting circuit 31 with respect to the second signal S2, it is also appropriate to effect the phase adjustment with respect to the output signal of the multiplying circuit 32 or the output signal of the balanced modulator 36. Further, it is appropriate to add the output signal of the balanced modulator 36 to an addition signal of the first and second signals S1 and S2 or add the first signal S1 to an addition signal of the output signal of the balanced modulator 36 and the second signal S2 or add all the first and second signals S1 and S2 and the output signal of the balanced modulator 36 by a single modulator having three input terminals. Moreover, if obtaining an adequate recording signal (corresponding to the FIG. 2(f) signal) by subtracting the output signal of the balanced modulator 36 from the first signal S1, in the FIG. 4B signal processing circuit 3 the adder 37 is changed to a substracter.

It is should be understood that the foregoing relates to only preferred embodiments of the invention, and that it is intended to cover all changes and modifications of the embodiments of the invention herein used for the purposes of the disclosure, which do not constitute departures from the spirit and scope of the invention.

What is claimed is:

1. A method of producing a frequency-multiplex signal on the basis of a first signal and a second signal whose frequency is lower than that of said first signal, to record the produced frequency-multiplex signal on a recording medium, comprising the steps of:
   doubling the frequency of said second signal so as to produce a frequency-doubled signal;
   multiplying the produced frequency-doubled signal by said first signal so as to produce a multiplication signal; and
   adding said multiplication signal to said second signal so as to produce an addition signal which is recorded as said frequency-multiplex signal on said recording medium.

2. A method of producing a frequency-multiplex signal on the basis of a first signal and a second signal whose frequency is lower than that of said first signal, to record the produced frequency-multiplex signal on a recording medium, comprising the steps of:
   doubling the frequency of said second signal so as to produce a frequency-doubled signal;
   adding said first signal to said second signal so as to produce an addition signal; and
   multiplying the produced frequency-doubled signal by the produced addition signal so as to produce a multiplication signal which is in turn recorded as said frequency-multiplex signal on said recording medium.

3. An apparatus for producing a frequency-multiplex signal on the basis of a plurality of signals so as to record the produced frequency-multiplex signal on a recording medium, comprising:
   first input terminal means for inputting a first signal;
   second input terminal means for inputting a second signal which has a frequency lower than that of said first signal;
   multiplying means coupled to said second input terminal means for multiplying the frequency of said second signal by 2;
   amplitude-modulating means coupled to said first input terminal means and said multiplying means for multiplying said first signal by the output signal of said multiplying means; and
   adder means coupled to said amplitude-modulating means and said second input terminal means for adding said second signal to the output signal of said amplitude-modulating means, the output signal of said adder means being recorded as said frequency-multiplex signal on said recording medium.

4. An apparatus as claimed in claim 3, further comprising phase-adjusting means provided between said second input terminal means and said multiplying means for adjusting the phase of said second signal, the output signal of said phase-adjusting means being supplied to said multiplying means.

5. An apparatus as claimed in claim 3, further comprising a level adjusting means provided between said multiplying means and said amplitude-modulating means to adjust the level of the output signal of said multiplying means.

6. An apparatus for producing a frequency-multiplex signal on the basis of a plurality of signals so as to record the produced frequency-multiplex signal on a recording medium, comprising:
   first input terminal means for inputting a first signal;
   second input terminal means for inputting a second signal which has a frequency lower than that of said first signal;

multiplying means coupled to said second input terminal means for multiplying the frequency of said second signal by 2;

balanced-modulating means coupled to said first input terminal means and said multiplying means for multiplying said first signal by the output signal of said multiplying means; and adder means for adding said first signal, said second signal and the output signal of said balanced-modulating means, the output signal of said adder means being recorded as said frequency-multiplexing signal on said recording medium.

7. An apparatus as claimed in claim 6, further comprising phase-adjusting means provided between said second input terminal means and said multiplying means for adjusting the phase of said second signal.

8. An apparatus as claimed in claim 6, further comprising a level adjusting means provided between said balanced-modulating means and said first adder means to adjust the level of the output signal of said balanced-modulating means.

* * * * *